(12) United States Patent
Suzuki (10) Patent No.: US 8,770,769 B2
(45) Date of Patent: Jul. 8, 2014

(54) DOOR MIRROR FOR AN AUTOMOBILE (75) Inventor: Kentaro Suzuki, Fujieda (JP)

(73) Assignee: Murakami Corporation, Shizuoka (JP)

( * ) Notice: Subject to any disclaimer, the term of this patent is extended or adjusted under 35 U.S.C. 154(b) by 402 days.

(21) Appl. No.: 12/938,612

(22) Filed: Nov. 3, 2010

(65) Prior Publication Data
US 2011/0204667 A1 Aug. 25, 2011

(30) Foreign Application Priority Data
Feb. 25, 2010 (JP) .................................. 2010-040634

(51) Int. Cl.
G02B 7/182 (2006.01)
B60R 1/06 (2006.01)
B60R 1/074 (2006.01)

(52) U.S. Cl.
CPC .. B60R 1/06 (2013.01); B60R 1/074 (2013.01)
USPC ........... 359/871; 359/872; 359/841; 359/879; 248/476; 248/479

(58) Field of Classification Search
CPC ............ B60R 1/074; B60R 1/06; B60R 1/02; B60R 1/072
USPC ........ 248/476, 475.1, 479, 466, 274.1, 349.1, 248/346.03; 359/841, 838, 872, 877, 879, 359/871
See application file for complete search history.

(56) References Cited

U.S. PATENT DOCUMENTS

| | | | |
|---|---|---|---|
| 5,190,499 A * | 3/1993 | Mori et al. ....................... | 464/36 |
| 7,448,762 B2 * | 11/2008 | Su ................................. | 359/841 |
| 7,887,202 B1 * | 2/2011 | Peterson ........................ | 359/841 |
| 8,201,305 B2 * | 6/2012 | Brouwer et al. ................ | 16/354 |
| 8,210,726 B2 * | 7/2012 | Suzuki et al. .................. | 362/494 |
| 2003/0058554 A1 * | 3/2003 | Hayashi et al. ............... | 359/841 |
| 2009/0244744 A1 | 10/2009 | Okamoto et al. | |

(Continued)

FOREIGN PATENT DOCUMENTS

CN 101544208 9/2009
EP 1106434 6/2001

(Continued)

OTHER PUBLICATIONS

U.S. Appl. No. 12/938,631 to Suzuki et al, Nov. 3, 2010.

(Continued)

*Primary Examiner* — Todd M Epps
(74) *Attorney, Agent, or Firm* — Greenblum & Bernstein P.L.C.

(57) ABSTRACT

The present invention has an object to provide a door mirror for an automobile in which a variation in a gap between a bottom wall of a housing and a pedestal portion of a door-mirror base is eliminated. In this door mirror for an automobile, even if distortion, contraction error or the like occurs in a lower housing after molding, if the frame and the shaft are assembled rotatably with accuracy, since a lower end face of a shaft container portion provided on the frame rotatably connected to the shaft fixed to a pedestal portion of the door-mirror base is in contact with the peripheral edge portion of an opening portion in the inner face of a bottom wall of the lower housing, the housing can be fixed to the frame without an error in the positional relationship between the peripheral edge portion of the opening portion of the lower housing and the shaft.

9 Claims, 11 Drawing Sheets

(56) References Cited

U.S. PATENT DOCUMENTS

| | | | |
|---|---|---|---|
| 2010/0238570 A1* | 9/2010 | Reedman et al. | 359/841 |
| 2010/0296185 A1 | 11/2010 | Itoh et al. | |
| 2011/0141592 A1* | 6/2011 | Iseki | 359/841 |

FOREIGN PATENT DOCUMENTS

| | | |
|---|---|---|
| JP | 63-155745 | 10/1988 |
| JP | 10-100794 | 4/1998 |
| JP | 2001-225698 | 8/2001 |
| JP | 2009-83696 | 4/2009 |
| JP | 2009-241618 A | 10/2009 |

OTHER PUBLICATIONS

Japan Office action, mail date is Jul. 23, 2013.

China Office action, mail date is Jan. 6, 2014.

* cited by examiner

DOOR MIRROR FOR AN AUTOMOBILE

CROSS-REFERENCE TO RELATED APPLICATION

The disclosure of Japanese Patent Application No. JP2010-040634 filed on Feb. 25, 2010 including the specification, drawings and abstract is incorporated herein by reference in its entirely.

BACKGROUND OF THE INVENTION

1. Field of the Invention

The present invention particularly relates to a door mirror for an automobile fixed to a front-side door.

2. Related Background of the Invention

Prior-art technologies of this field include Japanese Patent Laid-Open No. 2009-241618. The door mirror for an automobile described in this Gazette includes a door-mirror base fixed to a front-side door, a shaft whose lower end is fixed to a pedestal portion of the door-mirror base by a screw, a frame made of resin that is rotatable with respect to the shaft and fixes a tilting mechanism of the mirror and the like, and a cup-shaped housing made of resin to which the frame is fixed and through which the shaft penetrates. Since a gap is generated between the pedestal portion of the door-mirror base and a peripheral edge portion of an opening portion formed in the housing so that the shaft protrudes, a rib is formed at a position corresponding to the gap at the lower end of the shaft in order to reduce a wind noise caused by this gap.

SUMMARY OF THE INVENTION

However, though the housing is fixed by the screw to the frame rotatably connected to the shaft, a positional relationship between the peripheral edge portion of the opening portion formed in the housing and the shaft can easily go out of order due to distortion, contraction error and the like after molding of the frame and the housing. As a result, there has been a problem that when the shaft is fixed to the door-mirror base, the gap between the peripheral edge portion of the opening portion formed in a bottom wall of the housing and the pedestal portion of the door-mirror base can be easily varied.

The present invention has an object to provide a door mirror for an automobile in which the variation in the gap between the bottom wall of the housing and the pedestal portion of the door-mirror base is eliminated.

The present invention is a door mirror for an automobile including a door-mirror base, a shaft fixed to a pedestal portion of the door-mirror base, a frame rotatable with respect to the shaft, and a cup-shaped housing to which the frame is fixed and having an opening portion that enables a connection between the shaft and the door-mirror base and rotating around a rotation axis of the shaft, in which the opening portion is formed in a bottom wall of the housing, a shaft container portion surrounding the shaft is formed on the frame, and a peripheral edge portion of the opening portion on the inner face of the bottom wall is brought into contact with a lower end face of the shaft container portion of the frame.

In this door mirror for an automobile, even if distortion, contraction error or the like after molding occurs in the housing, if the frame and the shaft are assembled rotatably with accuracy, since the lower end face of the shaft container portion provided on the frame rotatably connected to the shaft that is fixed to the door-mirror base is brought into contact with the peripheral edge portion of the opening portion in the inner face of the bottom wall of the housing, the housing can be fixed to the frame without an error in the positional relationship between the peripheral edge portion of the opening portion of the housing and the shaft. Therefore, when the shaft is fixed to the door-mirror base, a variation in the gap between the bottom wall of the housing and the pedestal portion of the door-mirror base can hardly occur, whereby an appearance quality of the door mirror is improved, and dimensional management in manufacture of the door mirror is facilitated.

Also, it is preferable that a projection portion for crimping and fixing that protrudes radially is provided on the lower part of the shaft container portion, and a crimping and fixing portion into which the projection portion enters and which presses the upper face of the projection portion in a direction of the rotation axis of the shaft is provided on the housing.

With such configuration, since the lower end face of the shaft container portion of the frame can be easily brought into contact with the peripheral edge portion of the opening portion of the housing, the housing can be easily assembled to the frame.

Also, it is preferable that on the lower part of the shaft container portion, a projection portion for movement restriction that protrudes radially is provided; and a positioning portion with which a front end face of the projection portion for movement restriction in a movement direction thereof is brought into contact is provided on the housing.

With such configuration, when the lower end face of the shaft container portion of the frame is brought into contact with the peripheral edge portion of the opening portion of the housing, the frame can be positioned to the housing. As a result, assembling workability of the frame to the housing can be improved.

Also, it is preferable that the crimping and fixing portion and the positioning portion are disposed so as to surround the opening portion; and the shaft container portion integrally formed on the frame rotates around the rotation axis, thereby causes the projection portion for crimping and fixing to enter the crimping and fixing portion, and brings the projection portion for movement restriction into contact with the positioning portion.

With such configuration, after the frame is caused to enter the cup-shaped housing, the projection portion for crimping and fixing of the frame can be caused to enter the crimping and fixing portion of the housing by rotating the frame around the shaft container portion of the frame, and the projection portion for movement restriction of the frame can be brought into contact with the positioning portion of the housing. Such work to rotate the frame is extremely suitable to a case in which the frame is caused to enter through an open portion of the cup-shaped housing.

Also, it is preferable that a cylindrical boss portion projecting in the rotation axis direction is provided on the frame in the vicinity of the shaft container portion, a boss receiving portion into which the lower end portion of the boss portion enters is provided on the inner face of the bottom wall of the housing, and a female screw portion into which a screw penetrating the bottom wall is screwed is disposed on the boss portion; a screw through hole through which the screw penetrates is provided on the bottom wall, communicating with the boss receiving portion, and the boss receiving portion is formed by a wall portion installed upright around the screw through hole; and the wall portion includes a front wall located on the upstream side and a rear wall located on the downstream side in the rotation direction of the shaft container portion, the rear wall is formed higher than the front wall, and a guide portion formed on the bottom wall has an inclined face on which a lower end face of the boss portion slides up toward a top face of the front wall during rotation of the shaft container portion.

With such configuration, during a work of rotation around the shaft container portion of the frame in the cup-shaped housing, the lower end face of the boss portion is moved so as to slide up the inclined face and then, the boss portion drops into the boss receiving portion after passing by the front wall and is fitted therein. At this time, since the movement of the frame is restricted by the rear wall, the positioning of the frame to the housing is made possible, whereby the assembling workability of the frame to the housing is improved. As mentioned above, the boss portion used for firmly fixing the shaft container portion of the frame to the housing can be effectively used and the positioning of the frame to the housing can be easily achieved.

According to the present invention, a variation in the gap between the peripheral edge portion of the opening portion formed in the housing so that the shaft protrudes and the pedestal portion of the door-mirror base can be eliminated.

BRIEF DESCRIPTION OF THE DRAWINGS

FIGS. 9(1) and 9(2) are views corresponding to FIGS. 8(1) and 8(2), respectively.
FIGS. 10(3) to 10(5) are views corresponding to FIGS. 8(3) to 8(5), respectively.

DESCRIPTION OF THE PREFERRED EMBODIMENTS

A preferred embodiment of a door mirror for an automobile according to the present invention will be described below in detail referring to the attached drawings.

Figure 1:
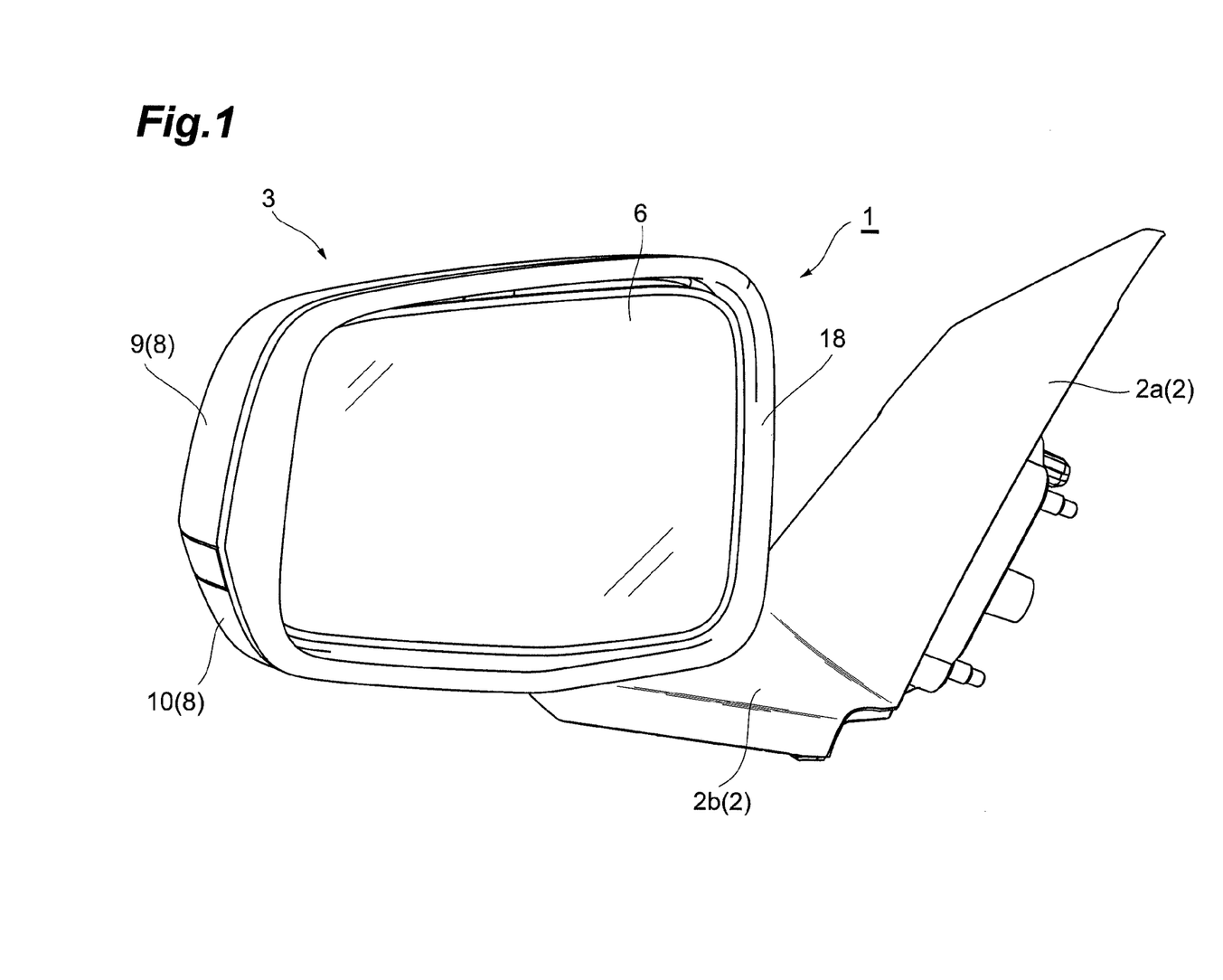
FIG. 1 is a perspective view of an embodiment of a door mirror for an automobile according to the present invention.
Figure 2:
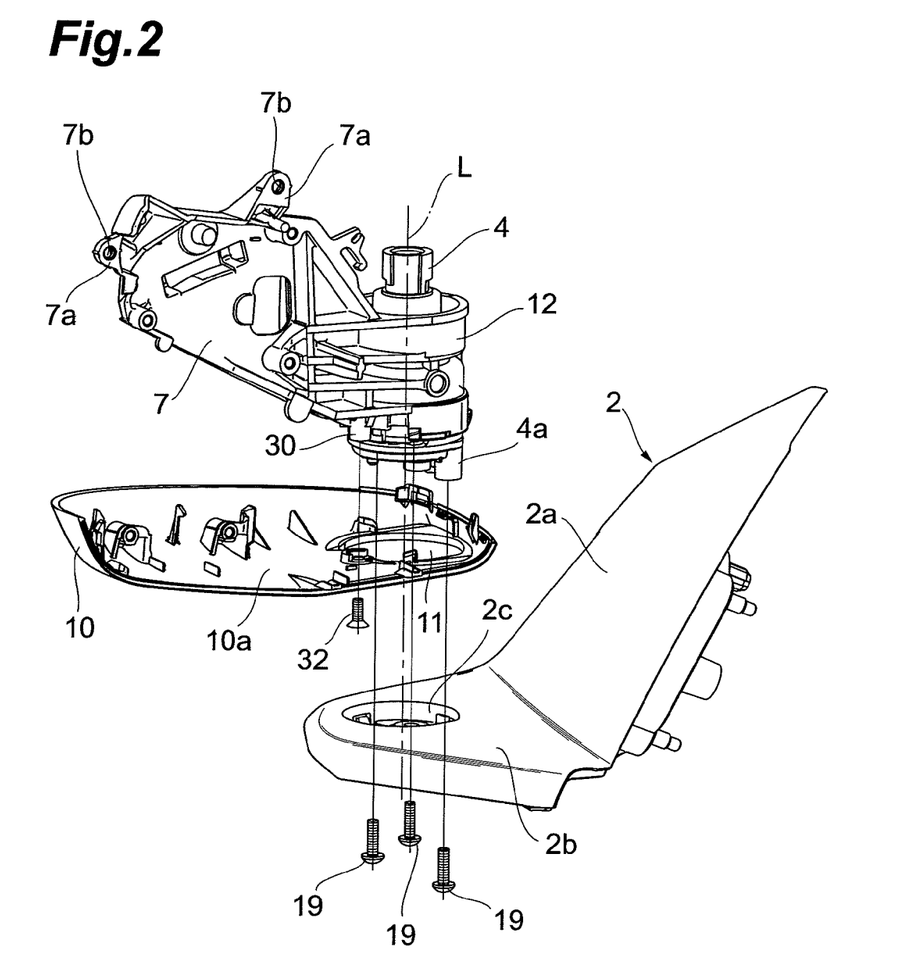
FIG. 2 is an exploded perspective view of the door mirror.

As shown in FIGS. 1 and 2, the door mirror 1 for an automobile includes a door-mirror base 2 made of resin and having a pedestal portion 2b horizontally extending from a base portion 2a bolted to a front door and a door-mirror main body 3 mounted to the pedestal portion 2b of the door-mirror base 2. This door-mirror main body 3 has a shaft 4 whose lower end is fixed to the pedestal portion 2b of the door-mirror base 2 by a screw 19, a frame 7 made of resin that fixes a tilting mechanism of a mirror 6 and the like and is rotatable with respect to the shaft 4, and a cup-shaped housing 8 made of resin to which the frame 7 is fixed and through which the shaft 4 penetrates. A lower end portion 4a of the shaft 4 is fitted into a recess portion 2c formed in the pedestal portion 2b and fixed therein by the screw 19.

The housing 8 is vertically divided into two parts, that is, an upper housing 9 and a lower housing 10. In the housing 8, an opening 8a through which a mirror 6 is exposed is provided, and a housing frame 18 fitted with the housing 8 is attached around the opening 8a. On the lower housing 10, a bottom wall 10a extending substantially horizontally is provided, and the shaft 4 protrudes from this bottom wall 10a. A mounting piece 7a provided on the frame 7 is brought into contact with a projection portion (not shown) on an inner wall of the housing 8, and by screwing the screw inserted through a screw insertion hole 7b formed in the mounting piece 7a into the projection portion of the housing 8, the housing 8 is fixed to the frame 7.

Figure 3:
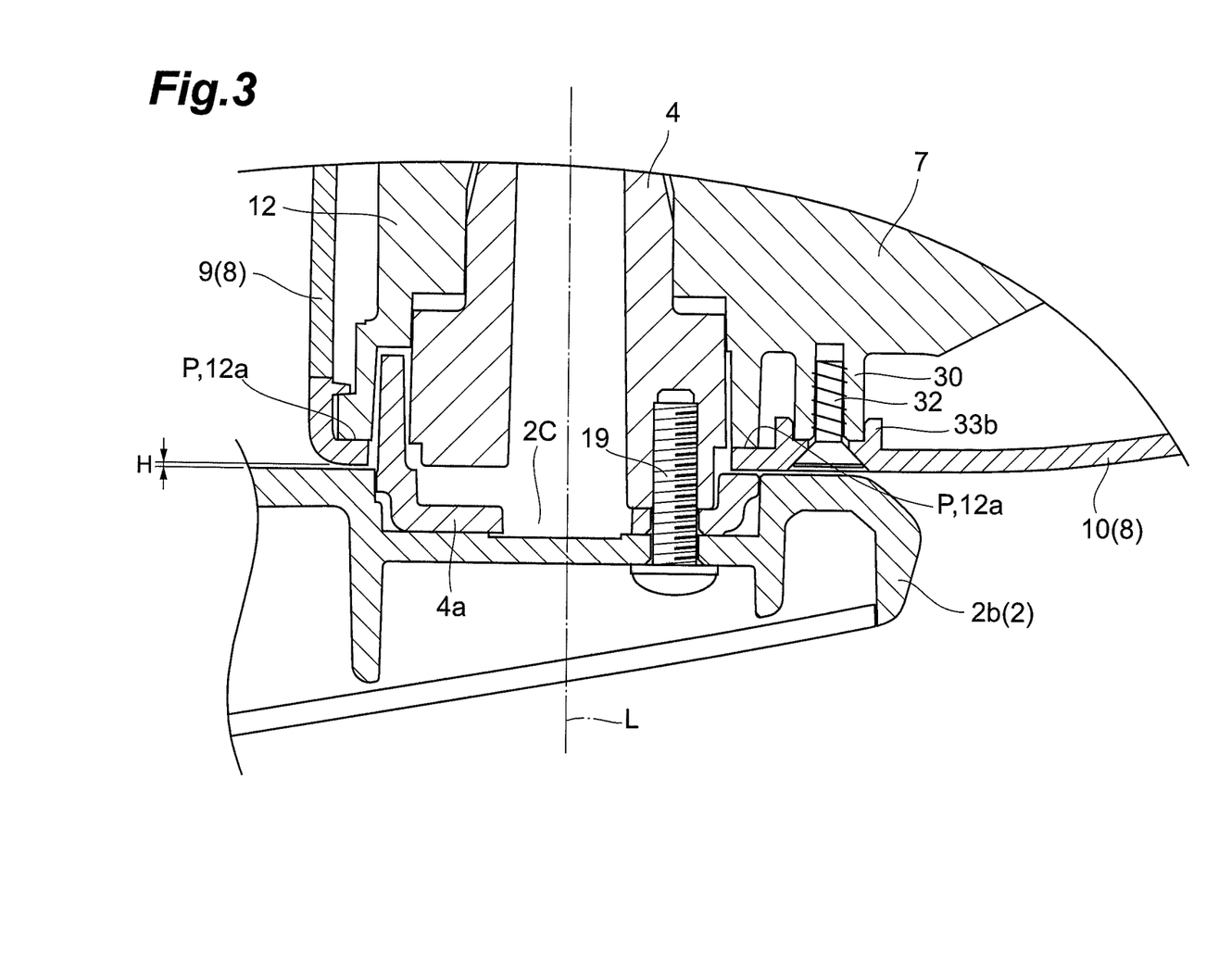
FIG. 3 is an enlarged sectional view of an essential part of the door mirror.
Figure 4:
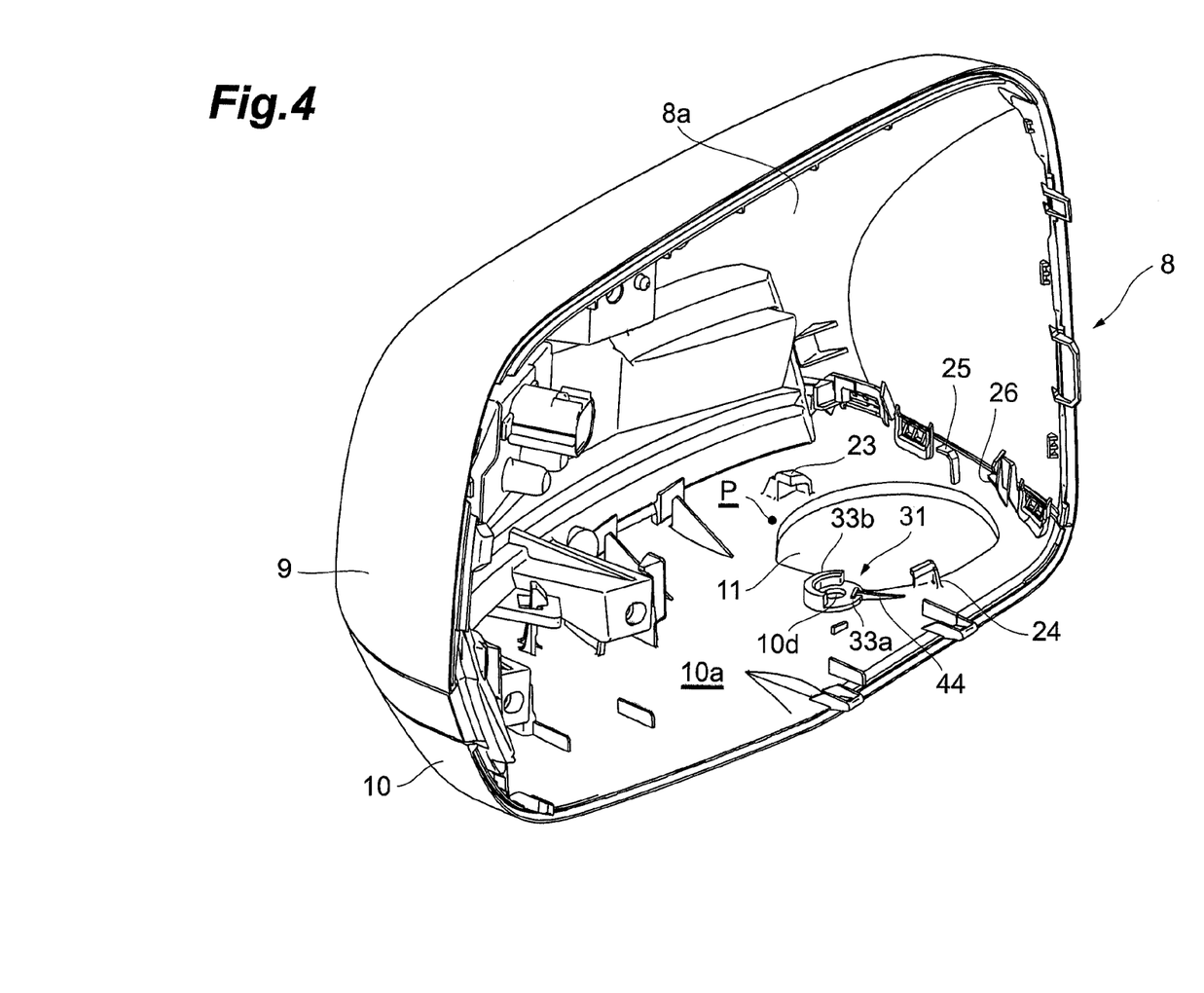
FIG. 4 is a perspective view illustrating a housing.
Figure 5:
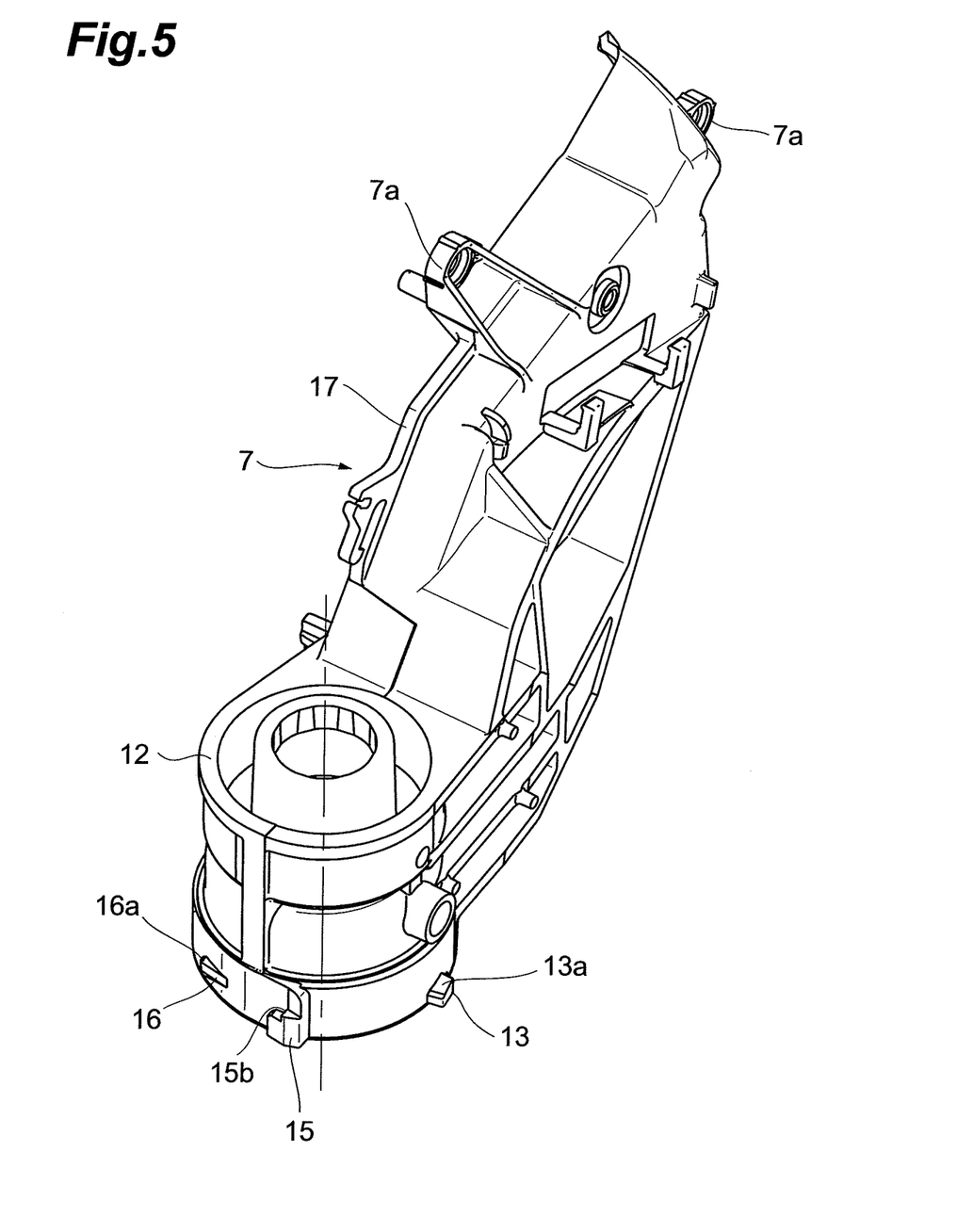
FIG. 5 is a perspective view illustrating a frame.

As shown in FIGS. 3 to 5, in the bottom wall 10a of the lower housing 10, in order to enable a connection between the shaft 4 and the door-mirror base 2, an opening portion 11 that makes penetration of the shaft 4 possible is formed. The frame 7 includes a cylindrical shaft container portion 12 that surrounds the shaft 4 and a frame main body 17 integrally molded with the shaft container portion 12, protruding radially from the shaft container portion 12 and fixing a tilting mechanism of the mirror 6 and the like, and the mounting piece 7a that fixes the frame 7 to the housing 8 is formed on the frame main body 17.

Figure 6:
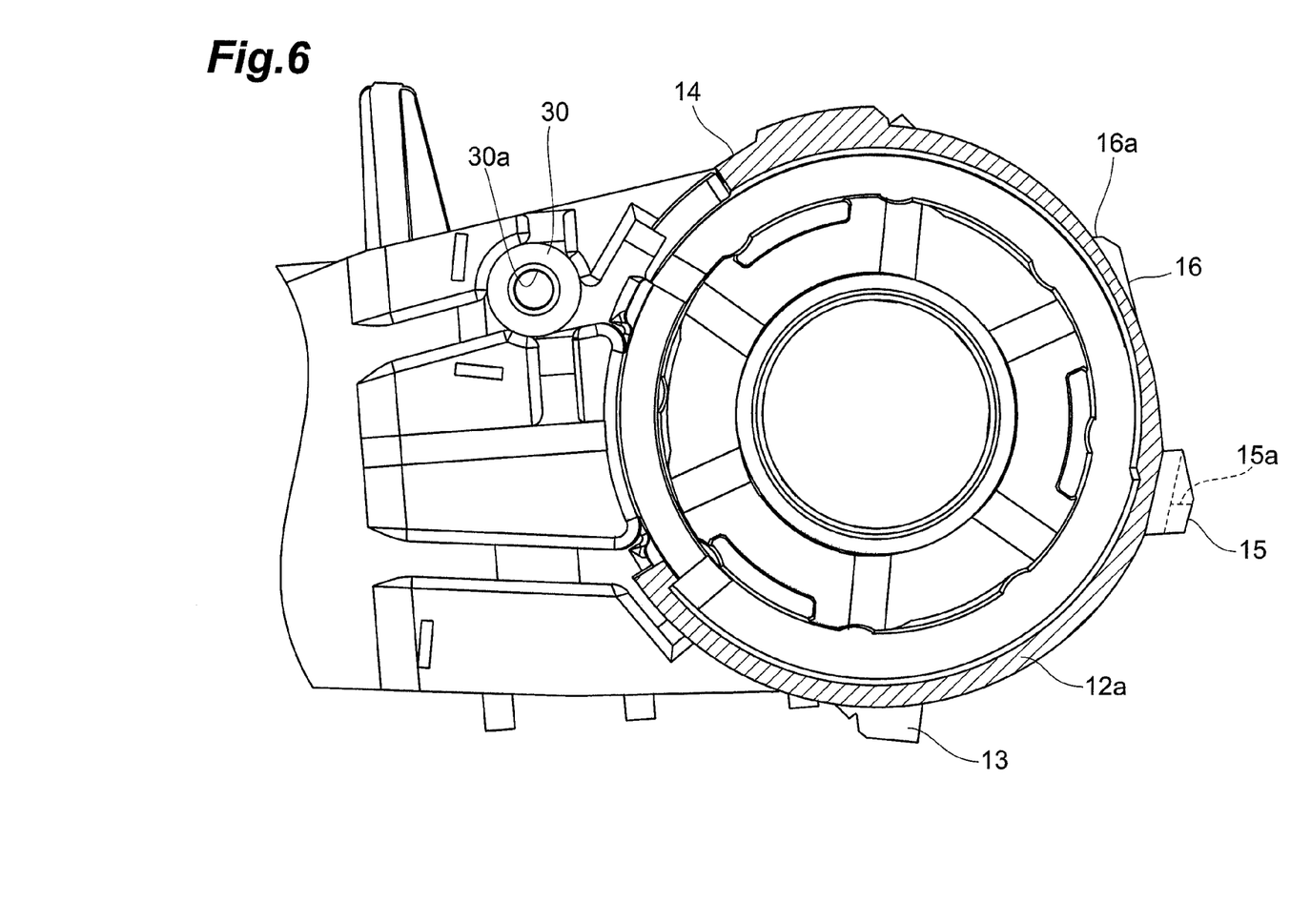
FIG. 6 is an enlarged bottom view of an essential part of the frame.
Figure 7:
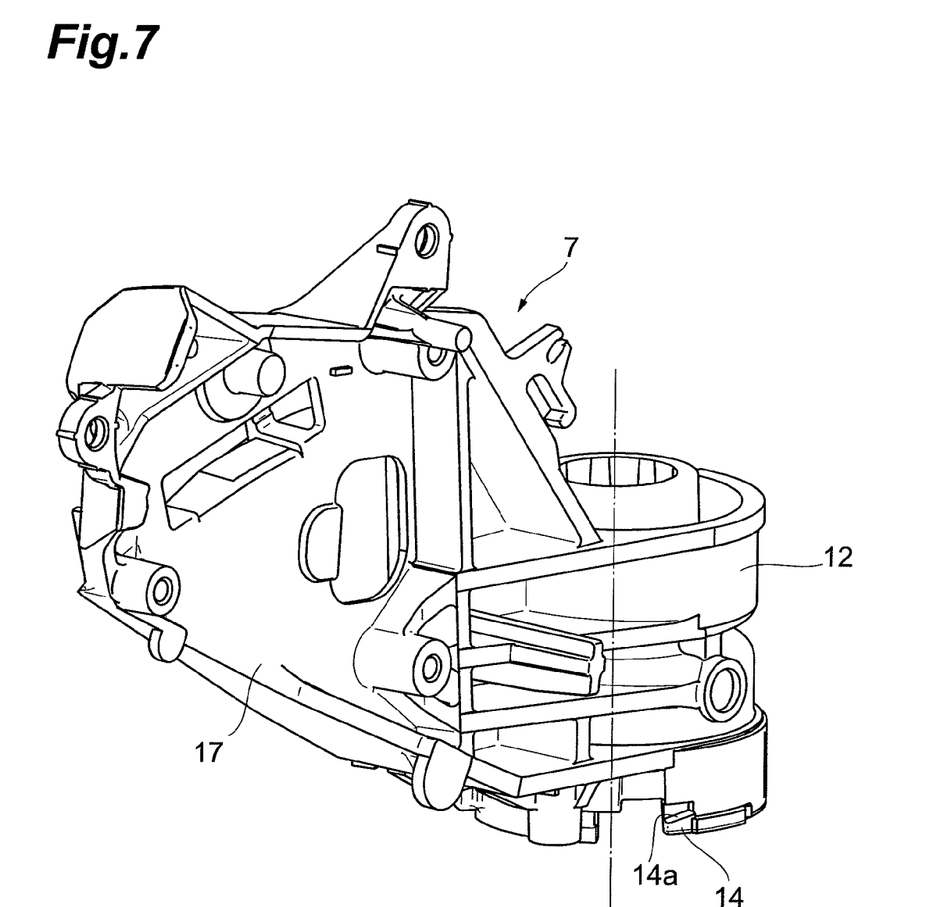
FIG. 7 is a perspective view illustrating the frame.
Figure 8:
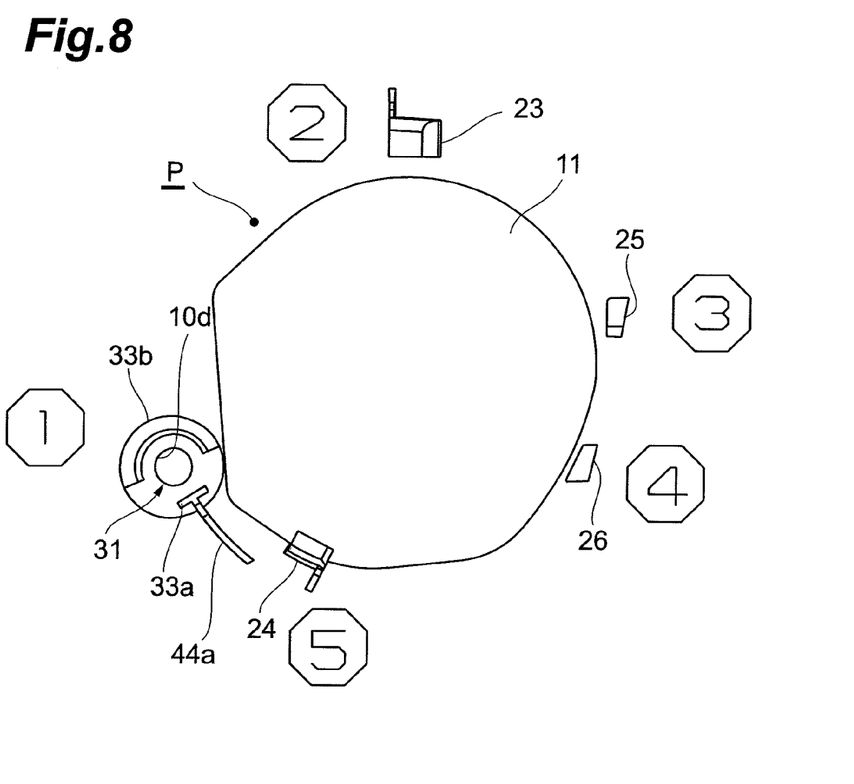
FIG. 8 is an enlarged plan view of the essential part of the frame.

On the inner face of the bottom wall 10a, a peripheral edge portion P of the opening portion 11 is brought into contact with a lower end face 12a (a shaded portion in FIG. 6) of the shaft container portion 12 in the frame 7. The lower end face 12a of the shaft container portion 12 is crimped onto the peripheral edge portion P of the opening portion 11 and moreover, positioned therein.

In the door mirror 1 for an automobile, even if distortion, contraction error or the like occurs in the lower housing 10 after molding, if the frame 7 and the shaft 4 are assembled rotatably with accuracy, since the lower end face 12a of the shaft container portion 12 provided on the frame 7 rotatably connected to the shaft 4 fixed to the pedestal portion 2b of the door-mirror base 2 is in contact with the peripheral edge portion P of the opening portion 11 in the inner face of the bottom wall 10a of the lower housing 10, the housing 8 can be fixed to the frame 7 without an error in the positional relationship between the peripheral edge portion P of the opening portion 11 of the lower housing 10 and the shaft 4. Therefore, when the shaft 4 is fixed to the pedestal portion 2b of the door-mirror base 2, a variation hardly occurs in a gap H between the bottom wall 10a of the lower housing 10 and the pedestal portion 2b of the door-mirror base 2, whereby an appearance quality of the door mirror 1 can be improved and dimensional management in manufacture of the door mirror 1 is facilitated.

As shown in FIGS. 4 to 10, on the lower part of the shaft container portion 12, first to fourth projection portions 13, 14, 15, and 16 for crimping and fixing that project radially are provided. Corresponding to them, on the inner wall surface of the lower housing 10, first to fourth crimping and fixing portions 23, 24, 25, and 26 into which the first to fourth projection portions 13, 14, 15, and 16 for crimping and fixing enter are provided. The first to fourth crimping and fixing portions 23, 24, 25, and 26 are arranged so as to surround the opening portion 11.

The first projection portion 13 for crimping and fixing and the second projection portion 14 for crimping and fixing have a truncated pyramid shape, and on an upper face of the first projection portion 13 for crimping and fixing, a first inclined face 13a forming downward inclination from the upstream side to the downstream side in a direction (an arrow A) where the shaft container portion 12 is rotated around a rotation axis L during assembling is provided, and similarly, on an upper face of the second projection portion 14 for crimping and fixing, a second inclined face 14a forming downward inclination from the upstream side to the downstream side in a direction (the arrow A) where the shaft container portion 12 is rotated around the rotation axis L during assembling is provided. Also, on the upper parts of the third and fourth projection portions 15 and 16 for crimping and fixing, crimping faces 15a and 16a extending substantially horizontally are formed.

In the first crimping and fixing portion 23 forming a pair with the first projection portion 13 for crimping and fixing, a recess portion 23a that accommodates the first projection portion 13 for crimping and fixing is provided, and on the inner face of an upper wall 23b for forming an upper part of the recess portion 23a, a third inclined face 23c brought into contact with the first inclined face 13a of the first projection portion 13 for crimping and fixing when the first projection portion 13 for crimping and fixing is moved in the direction of the arrow A is formed, and the first inclined face 13a and the third inclined face 23c have substantially the same inclination angles.

In the second crimping and fixing portion 24 forming a pair with the second projection portion 14 for crimping and fixing, a recess portion 24a that accommodates the second projection portion 14 for crimping and fixing is provided, and on the inner face of an upper wall 24b for forming an upper part of the recess portion 24a, a fourth inclined face 24c brought into contact with the second inclined face 14a of the second projection portion 14 for crimping and fixing when the second projection portion 14 for crimping and fixing is moved in the direction of the arrow A is formed, and the second inclined face 14a and the fourth inclined face 24c have substantially the same inclination angles.

The third crimping and fixing portion 25 forming a pair with the third projection portion 15 for crimping and fixing is formed in the inverted L-shape whose one end side is opened in order to accommodate the third projection portion 15 for crimping and fixing. The third crimping and fixing portion 25 has an upper wall 25a extending substantially horizontally, and the inner face of the upper wall 25a is crimped onto the crimping face 15a of the third projection portion 15 for crimping and fixing when the third projection portion 15 for crimping and fixing is moved in the direction of the arrow A.

The fourth crimping and fixing portion 26 forming a pair with the fourth projection portion 16 for crimping and fixing is formed in the inverted L-shape whose one end side is opened in order to accommodate the fourth projection portion 16 for crimping and fixing. The fourth crimping and fixing portion 26 has an upper wall 26a extending substantially horizontally, and the inner face of the upper wall 26a is crimped onto the crimping face 16a of the fourth projection portion 16 for crimping and fixing when the fourth projection portion 16 for crimping and fixing is moved in the direction of the arrow A.

Moreover, the third projection portion 15 for crimping and fixing functions as a projection portion for movement restriction, and on the upper part of the third projection portion 15 for crimping and fixing/movement restriction, an end face in the direction (the arrow A) for rotating the shaft container portion 12 around the rotation axis L during assembling is formed as a contact face 15b, and this contact face 15b is formed so as to project from an outer circumferential face of the cylindrical shaft container portion 12.

In the positioning portion (crimping and fixing portion) 25 forming a pair with this projection portion 15 for movement restriction (for crimping and fixing), a distal end face in the arrow A direction of the upper wall 25a extending substantially horizontally is formed as a to-be-contacted face 25b, and this to-be-contacted face 25b is abutted to the contact face 15b of the projection portion 15 for movement restriction when the projection portion 15 for movement restriction is moved in the arrow A direction.

Figure 11:
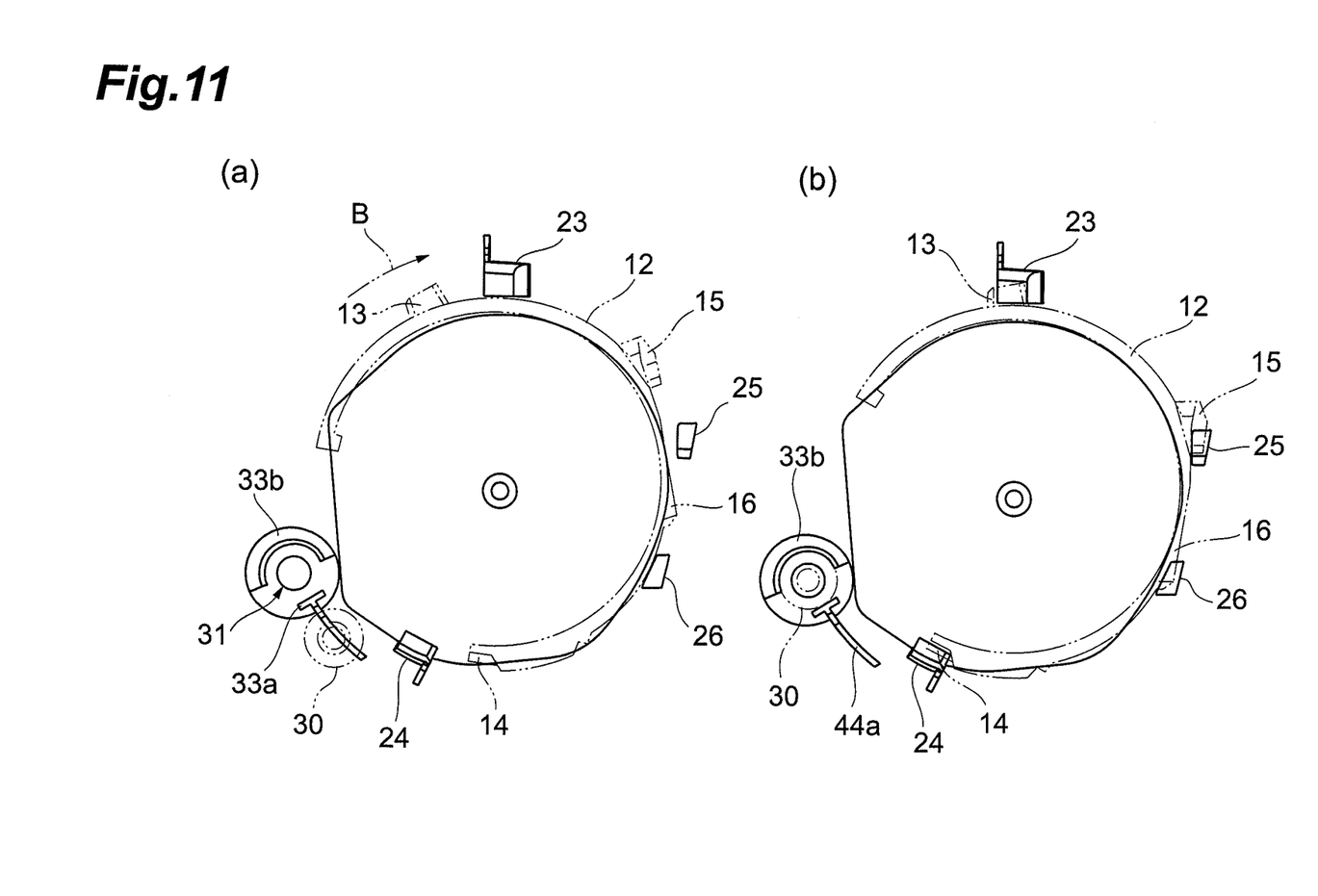
FIG. 11A is a plan view illustrating a state before a projection portion provided on the frame is fitted in a recess portion provided in the housing.
FIG. 11B is a plan view illustrating a state after the projection portion provided on the frame is fitted in the recess portion provided in the housing.

After the frame 7 is caused to enter into the cup-shaped housing 8, as shown in FIGS. 11A and 11B, the shaft container portion 12 of the frame 7 is rotated in an arrow B direction so as to cause the projection portions 13, 14, 15, and 16 for crimping and fixing of the frame 7 to enter into the crimping and fixing portions 23, 24, 25, and 26 of the housing 8, and the contact face 15b of the projection portion 15 for movement restriction (for crimping and fixing) of the frame 7 is brought into contact with the to-be-contacted face 25b of the positioning portion (crimping and fixing portion) 25 of the housing 8.

As a result, as shown in FIGS. 9(1) and 9(2) and FIGS. 10(3) to 10(5), the projection portions 13 and 14 for crimping and fixing are pressed in an arrow C direction by the inclined faces 23c and 24c of the crimping and fixing portions 23 and 24, and the projection portions 15 and 16 for crimping and fixing are pressed in the arrow C direction by the upper walls 25a and 26a of the crimping and fixing portions 25 and 26. As a result, the lower end face 12a of the shaft container portion 12 is firmly crimped to the peripheral edge portion P of the opening portion 11. Then, the projection portion 15 for movement restriction also functioning for crimping and fixing is brought into contact with the to-be-contacted face 25b of the positioning portion 25 also functioning as the crimping and fixing portion and stopped in an arrow D direction.

With the above configuration, assembling of the housing 8 to the frame 7 can be performed easily, and workability can be improved. The work to rotate the frame 7 is extremely suitable if a work such that the frame 7 is caused to enter through the opening 8a of the cup-shaped housing 8 is performed.

As shown in FIGS. 2 to 4, on the frame main body 17, a cylindrical boss portion 30 projecting in the direction of the rotation axis L is provided in the vicinity of the shaft container portion 12. On the inner face of the bottom wall 10a of the lower housing 10, a boss receiving portion 31 into which a lower-end portion of the boss portion 30 enters is provided, and on the boss portion 30, a female screw portion 30a to which a screw 32 penetrating the bottom wall 10a is screwed is provided. In the bottom wall 10a, a screw through hole 10d through which the screw 32 penetrates is provided communicating with the boss receiving portion 31. The boss receiving portion 31 is disposed between the first crimping and fixing portion 23 and the second crimping and fixing portion 24 and is formed by a wall portion 33 installed upright around the screw through hole 10d.

The wall portion 33 includes a linear front wall 33a located on the upstream side and an arc-shaped rear wall 33b located on the downstream side in the rotation direction of the shaft container portion 12, and the rear wall 33b is formed higher than the front wall 33a. On the bottom wall 10a, a rib-shaped guide portion 44 is formed, and this guide portion 44 has an inclined face 44a on which a lower end face 30b of the boss portion 30 slides up toward a top face 33c of the front wall 33a during rotation of the shaft container portion 12.

Figure 9:
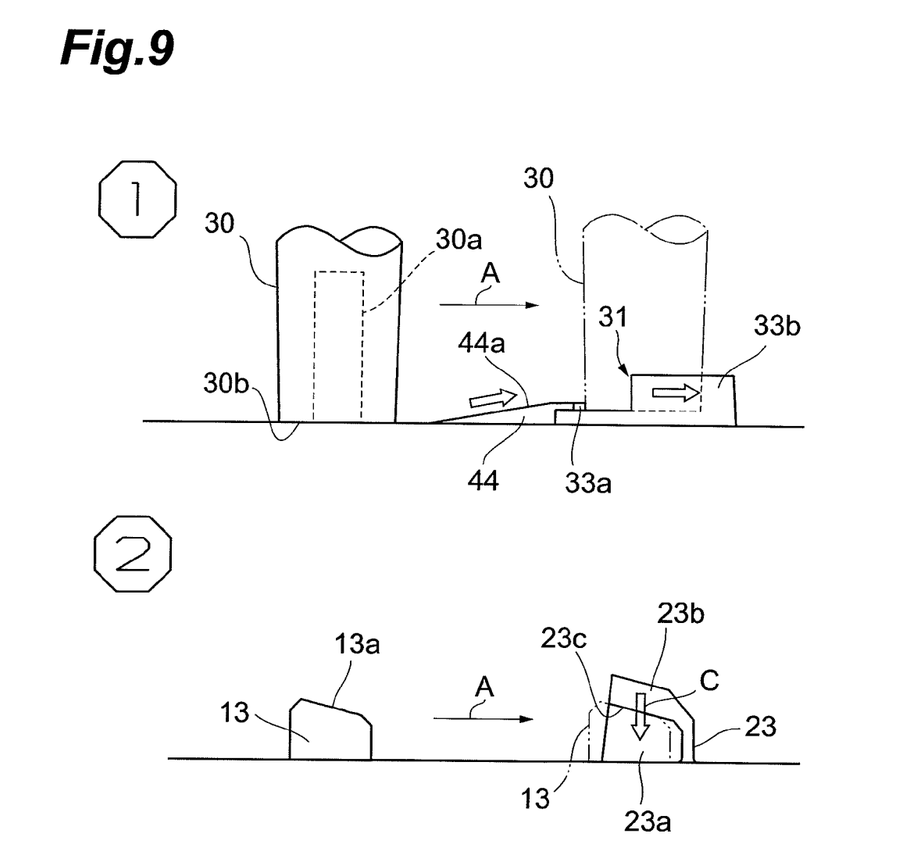
Figure 10:
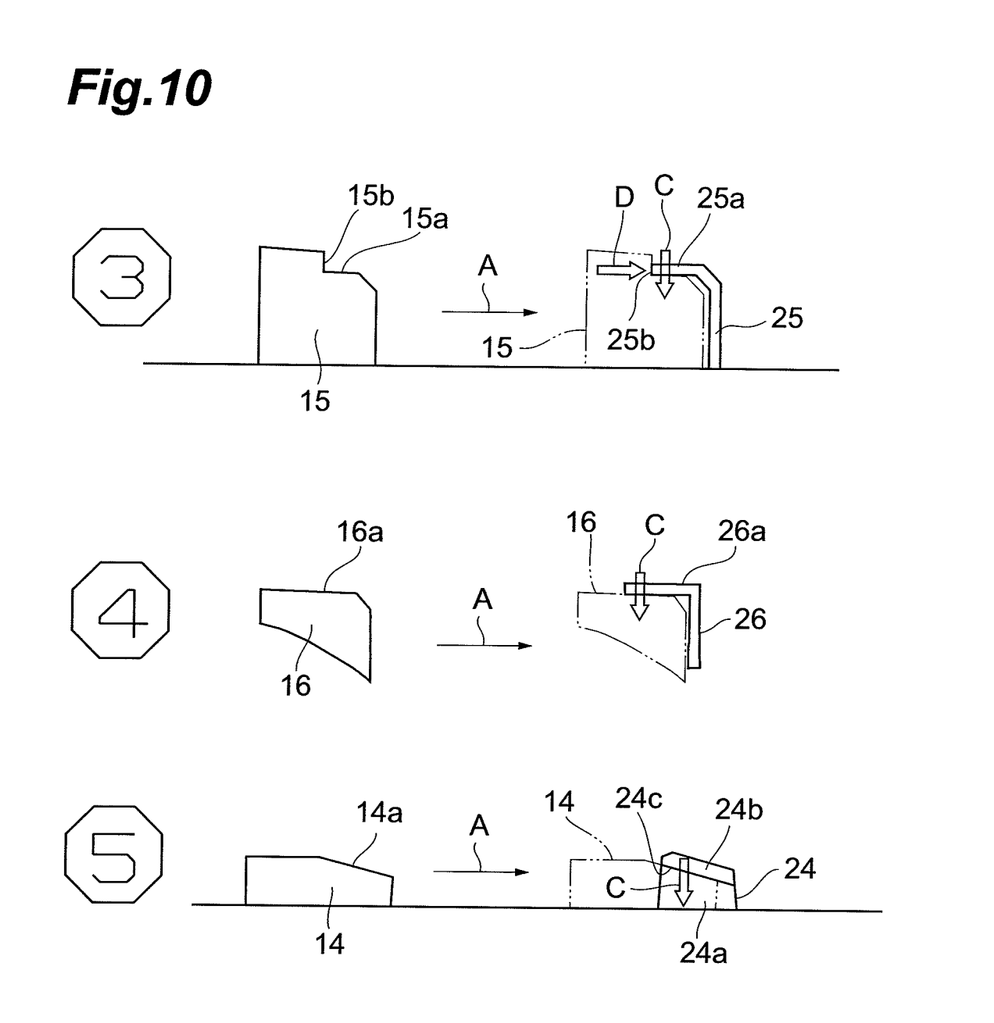

With such configuration, in the cup-shaped housing 8, when the work of rotation around the shaft container portion 12 of the frame 7 is performed, as shown in FIG. 9, the lower end face 30b of the boss portion 30 moves so as to slide up on the inclined face 44a and then, the boss portion 30 passes by the front wall 33a and then, drops into the boss receiving portion 31 and is fitted therein. At this time, since the movement of the frame 7 is restricted by the rear wall 33b, the positioning of the frame 7 to the housing 8 is made possible, whereby the assembling workability of the frame 7 to the housing 8 is improved.

Then in the vicinity of the peripheral edge portion P of the opening portion 11, the housing 8 is fixed to the frame 7 by the screw 32, and adoption of the screw 32 contributes to crimping and maintaining and positioning and maintaining of the lower end face 12a of the shaft container portion 12 to the peripheral edge portion P of the opening portion 11. As mentioned above, effective use of the boss portion 30 is promoted in order to firmly fix the shaft container portion 12 of the frame 7 to the housing 8, and positioning of the frame 7 to the housing 8 can be easily achieved.

It is needless to say that the present invention is not limited to the above-described embodiments. For example, as a portion to penetrate the opening portion 11 that enables a connection between the shaft 4 and the door-mirror base 2, the shaft 4 is explained as an example, but a portion protruding in the vertical direction from the pedestal portion 2a of the door-mirror base 2 may penetrate the opening portion 11.

The door mirror for an automobile according to the present invention can be applied to any type, whether it is a manual stored type or an electric stored type.

EXPLANATION OF REFERENCE NUMERALS 1 door mirror for an automobile
2 door-mirror base
2a pedestal portion
4 shaft
7 frame
8 housing
10 lower housing
10a bottom wall of housing
10d screw through hole
11 opening portion
12 shaft container portion
12a lower end face of shaft container portion
13, 14, 15, 16 projection portion for crimping and fixing
15 projection portion for movement restriction
23, 24, 25, 26 crimping and fixing portion
25 positioning portion
30 boss portion
31 boss receiving portion
32 screw
33 wall portion
33a front wall
33b rear wall
44 guide portion
44a inclined face
L rotation axis
H gap
P peripheral edge portion of opening portion

What is claimed is:

1. A door mirror for an automobile comprising:
    a door-mirror base;
    a shaft fixed to a pedestal portion of the door-mirror base;
    a frame rotatable with respect to the shaft; and
    a cup-shaped housing to which the frame is fixed and having an opening portion that enables a connection between the shaft and the door-mirror base and rotating around a rotation axis of the shaft, wherein
    the opening portion is formed in a bottom wall of the housing;
    a shaft container portion surrounding the shaft is formed on the frame; and
    a peripheral edge portion of the opening portion on an inner face of the bottom wall is brought into contact with a lower end face of the shaft container portion of the frame.

2. The door mirror for an automobile according to claim 1, wherein
    a projection portion for crimping and fixing that protrudes radially is provided on the lower part of the shaft container portion; and
    a crimping and fixing portion into which the projection portion enters and which presses an upper face of the projection portion in a direction of the rotation axis of the shaft is provided on the housing.

3. The door mirror for an automobile according to claim 2, wherein
    on a lower part of the shaft container portion, a projection portion for movement restriction that protrudes radially is provided; and
    a positioning portion with which a front end face of the projection portion for movement restriction in a movement direction thereof is brought into contact is provided on the housing.

4. The door mirror for an automobile according to claim 3, wherein
    the crimping and fixing portion and the positioning portion are disposed so as to surround the opening portion; and
    the shaft container portion integrally formed on the frame rotates around the rotation axis, thereby causes the projection portion for crimping and fixing to enter the crimping and fixing portion, and brings the projection portion for movement restriction into contact with the positioning portion.

5. The door mirror for an automobile according to claim 4, wherein
    a cylindrical boss portion projecting in a rotation axis direction is provided on the frame in the vicinity of the shaft container portion, a boss receiving portion into which a lower end portion of the boss portion enters is provided on the inner face of the bottom wall of the housing, and a female screw portion into which a screw penetrating the bottom wall is screwed is disposed on the boss portion;
    a screw through hole through which the screw penetrates is provided on the bottom wall, communicating with the boss receiving portion, and the boss receiving portion is formed by a wall portion installed upright around the screw through hole; and
    the wall portion includes a front wall located on an upstream side and a rear wall located on a downstream side in the rotation direction of the shaft container portion, the rear wall is formed higher than the front wall, and a guide portion formed on the bottom wall has an inclined face on which a lower end face of the boss portion slides up toward a top face of the front wall during rotation of the shaft container portion.

6. The door mirror according to claim 2, wherein the crimping and fixing portion is provided directly on an upper surface of the bottom wall at a periphery of the opening portion.

7. The door mirror according to claim 1, further comprising the bottom wall defining an outer exterior surface of the cup-shaped housing in a region outside of a pedestal portion.

8. The door mirror according to claim 7, wherein the bottom wall is positioned vertically beneath the frame with respect to a top surface of the housing.

9. The door mirror according to claim 8, wherein a portion of the bottom wall surrounding the peripheral edge portion of the opening portion is fixed between a lower surface of the frame and the pedestal portion.

* * * * *